(12) United States Patent
Clark

(10) Patent No.: US 6,408,787 B1
(45) Date of Patent: Jun. 25, 2002

(54) TRANSPORTABLE ANIMAL FEED STORAGE BIN

(76) Inventor: Donald P. Clark, 6721 Louisville Rd., Cox's Creek, KY (US) 40013

( * ) Notice: Subject to any disclaimer, the term of this patent is extended or adjusted under 35 U.S.C. 154(b) by 0 days.

(21) Appl. No.: 09/552,541

(22) Filed: Apr. 19, 2000

(51) Int. Cl.[7] ................................................. A01K 5/00
(52) U.S. Cl. ................................................. 119/51.01
(58) Field of Search ................................. 119/712, 708, 119/51.01, 52.1; 366/256

(56) References Cited

U.S. PATENT DOCUMENTS

| | | | | |
|---|---|---|---|---|
| 1,701,338 A | * | 2/1929 | Rowles | 119/54 |
| 1,719,245 A | * | 7/1929 | Smidley | 119/53.5 |
| 2,966,135 A | * | 12/1960 | Kelley et al. | 119/53.5 |
| 2,974,963 A | | 3/1961 | McBride | |
| 3,191,944 A | | 6/1965 | Watts | |
| 3,552,360 A | * | 1/1971 | Nelson | 119/53.5 |
| 3,899,138 A | | 8/1975 | van der Lely et al. | |
| 4,315,484 A | * | 2/1982 | Kingery | 119/53 |
| 4,377,130 A | * | 3/1983 | Schweiger | 119/51.5 |
| 4,392,595 A | | 7/1983 | Staniforth | |
| 4,479,456 A | * | 10/1984 | Schweiger | 119/51.5 |
| RE31,939 E | * | 7/1985 | Van Dusseldorp | 119/53.5 |
| 4,712,717 A | | 12/1987 | Egerdahl | |
| 4,926,722 A | | 5/1990 | Sorensen et al. | |
| 5,009,134 A | | 4/1991 | Sorensen et al. | |
| 5,036,798 A | * | 8/1991 | King | 119/53.5 |
| 5,375,559 A | * | 12/1994 | Baadsgaard | 119/58 |
| D435,706 S | * | 12/2000 | Clark | D30/121 |

\* cited by examiner

*Primary Examiner*—Charles T. Jordan
*Assistant Examiner*—Jordan Lofdahl
(74) *Attorney, Agent, or Firm*—Carrithers Law Office; David W. Carrithers

(57) ABSTRACT

A portable animal feed supply bin for holding a few feedings in which a hopper has a lid on the top end for refilling the hopper and a slide plate covering a feed dispensing open bottom end. Within the hopper is an open grate assembly attached to a bar slidably that is mounted by a housing removably attached to a wall of the hopper. A lever assembly, or gear drive, engages the grate assembly bar to raise and lower the grate assembly to break up clumps and bridging of the feed.

14 Claims, 5 Drawing Sheets

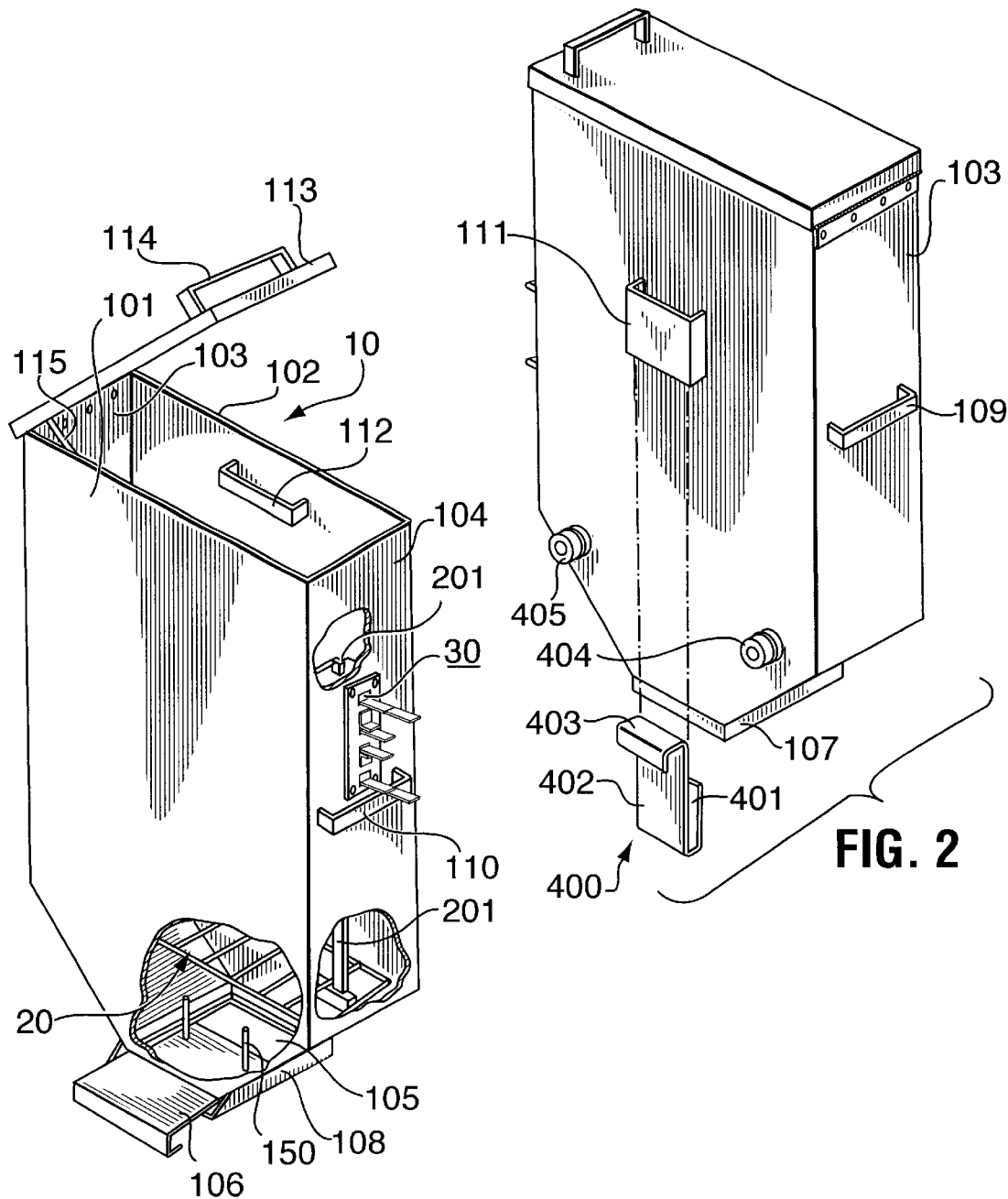

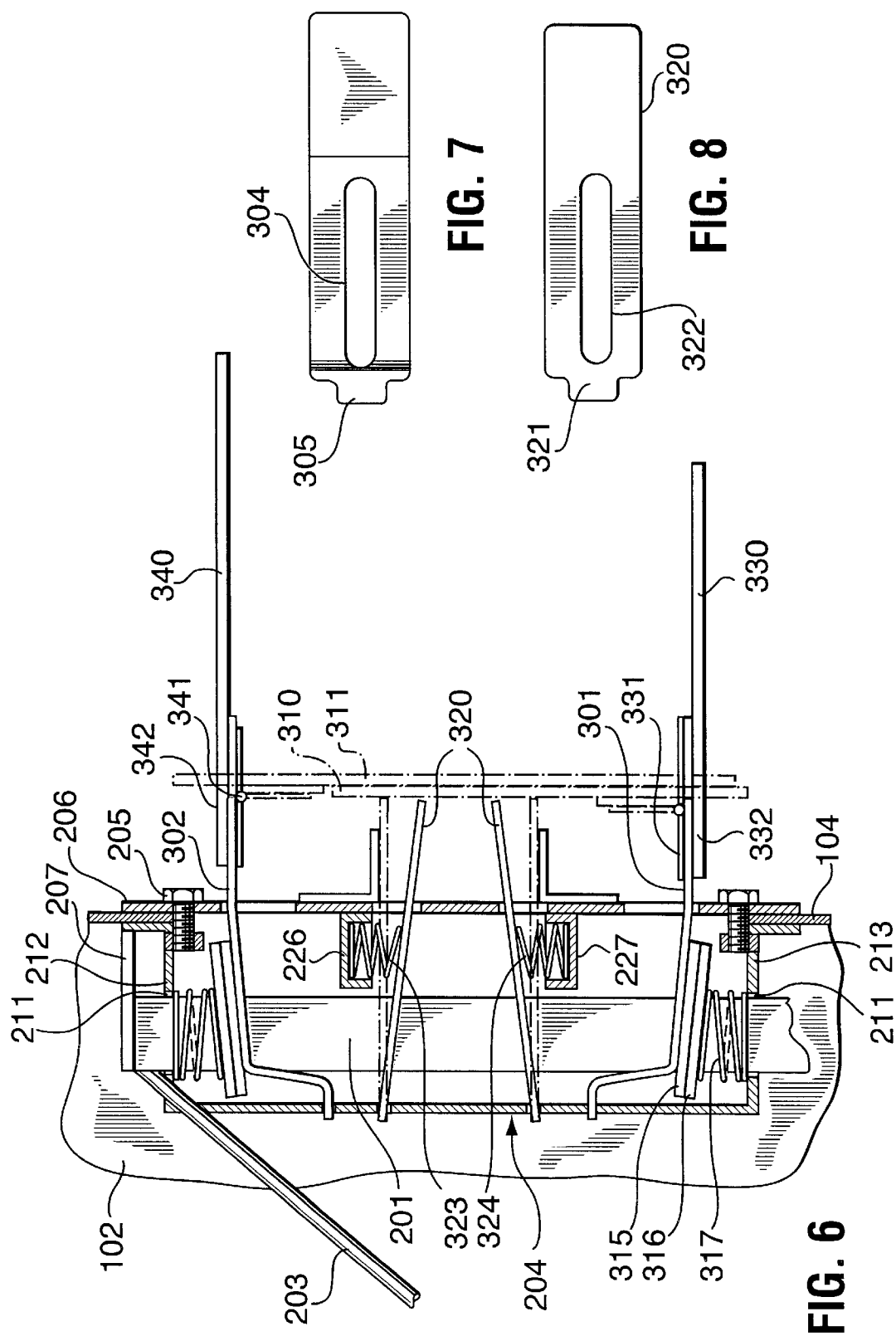

TRANSPORTABLE ANIMAL FEED STORAGE BIN

TECHNICAL FIELD

This invention relates generally to animal feed handling and more particularly to a readily transportable storage bin for animal feed.

BACKGROUND INFORMATION

Carrying animal feed, such as whole and/or ground grain, natural or fortified or pelletized feed, can be time consuming and/or inconvenient when an animal to be fed is in a corral or paddock and particularly so when the animal is located some distance from the main supply bin. It is even more difficult to have at hand a suitable and conveniently available supply of feed when the animal is being transported, for example by trailer from one sight to another as is often the case with race horses and/or show animals.

One of the problems associated with animal feed of the foregoing general type is that it clings together in clumps or bridges in a hopper. This becomes even more pronounced due to settling that takes place while being transported.

SUMMARY OF THE INVENTION

A principal object of the present invention is to provide a readily transportable animal feed supply bin for holding a few feedings and one which has an agitator in the hopper to loosen the bridged and/or compacted feed material.

BRIEF DESCRIPTION OF THE DRAWINGS

A better understanding of the present invention will be had upon reference to the following description in conjunction with the accompanying drawings in which like numerals refer to like parts throughout the several views and wherein: The invention is illustrated by way of example in the accompanying drawing wherein:

FIG. 1 is a front elevation, oblique, view of a portable animal feed bin provided in accordance with the present invention;

FIG. 2 is, in elevation, an oblique rear view of the bin shown in FIG. 1;

FIG. 6 is a part sectional view, on a larger scale, of the encircled portion of FIG. 3 showing in greater detail the agitator operating mechanism;

FIG. 7 is a plan view of one of the pair of levers of the mechanism shown in FIG. 6;

FIG. 8 is a plan view of one of a pair of lock levers of the mechanism shown in FIG. 6;

DESCRIPTION OF THE PREFERRED EMBODIMENTS

Figure 5:
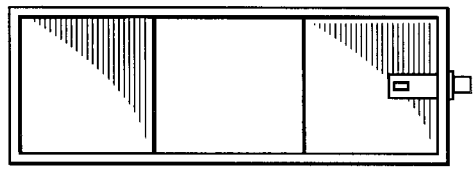
FIG. 5 is a top plan view of FIG. 3.
Figure 3:
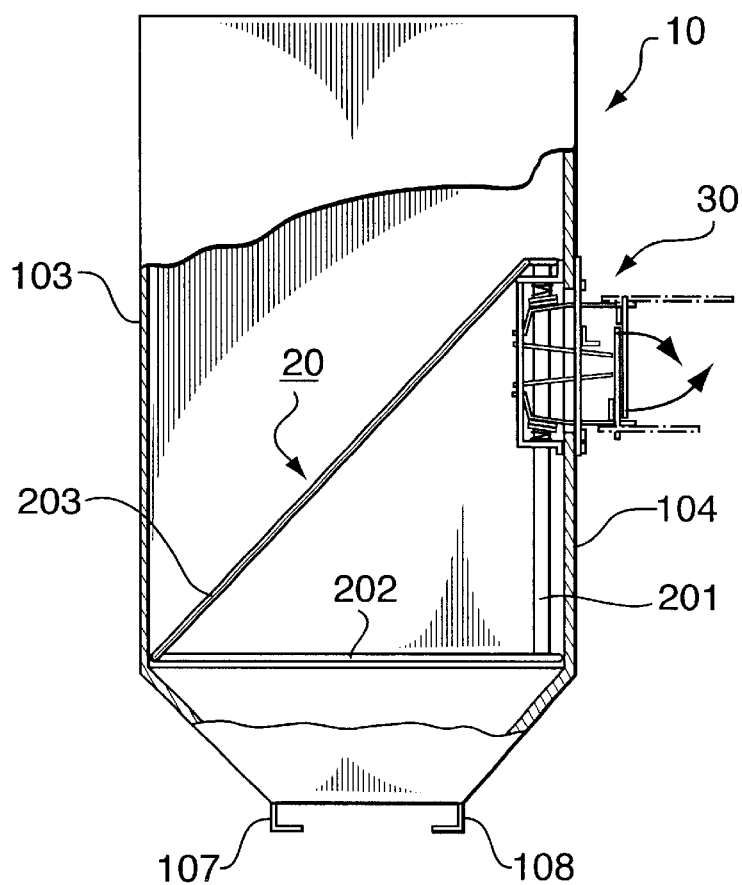
FIG. 3 is a front elevation, part broken, view of the feed bin showing the internal feed agitator and operating mechanism for the same.
Figure 4:
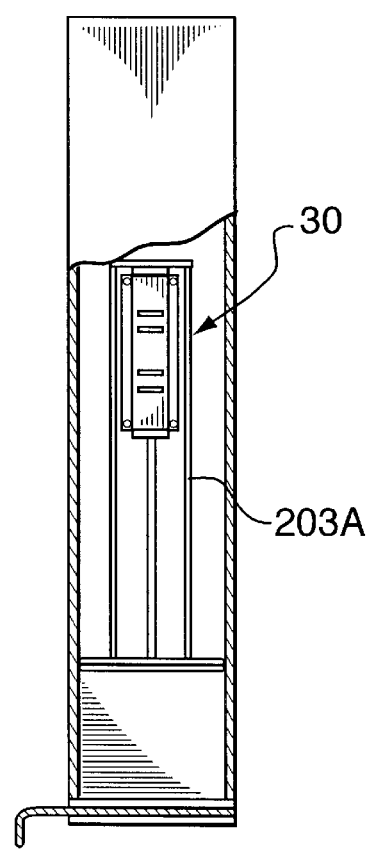
FIG. 4 is a right hand elevation, part broken, view of FIG. 3.

Illustrated in the drawings is a portable animal feed bin comprising a hopper 10 having an agitator 20 within the hopper to break up compacted animal feed grain, pelletized or similar food in the hopper and an agitator operating mechanism 30.

The hopper 10 has a front wall 101, a rear wall 102 and respective opposite side walls 103 and 104 the latter tapering inwardly to a hopper content discharge opening 105 in the bottom of the hopper. The opening is covered by a plate 106 slidably mounted in a pair of spaced apart channels provided between a lower end of end walls 103 and 104 and respective angle members 107 and 108 secured thereto and having legs directed toward one another.

Secured to the hopper, and external thereof, are carrying handles 109 and 110 on respective side walls 103 and 104 and a mounting bracket ill on the rear wall. A clip storage bracket 112 is secured to the rear wall and located within the hopper.

A lid 113, having a handle 114, is pivotally attached by a hinge to the end wall 103 and a known slotted lever and block unit 115 (or air cylinder) temporarily holds the lid in an open position facilitating filling the hopper.

The hopper is readily suspended from a horizontal stringer of a corral fence by a clip 400 that has a first leg 401 that slip fits between the rear wall 102 of the hopper and the bracket 111 secured thereto and a second leg 402 having a hook portion 403 for engaging a stringer of the fence. This clip can also be used to mount the hopper on a wall of for example a horse trailer and if need be bolts can be threaded into respective mounting spacers 404 and 405 on the rear wall of the hopper to securely lock the hopper during travel and also prevent theft. The clip 400, when not in use can be stored in the hopper on the bracket 112.

Figure 13:
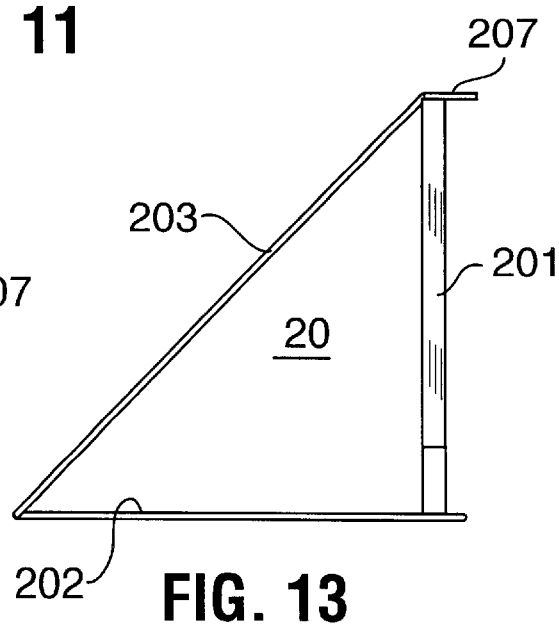
FIG. 13 is a side elevation view of the agitator shown inside the feed hopper in FIG. 3.

The agitator 20 comprises a bar 201, a first open grate assembly 202 secured at one end thereof to a lower end of the bar 201 and canter-levered therefrom to extend horizontally across the lower end of the hopper and a second inclined open grate assembly 203 secured at one end to the outer free end of the grate assembly 202 and at the other end to the top end of the bar 201. In side elevation, as seen in FIG. 13, the grate assemblies and bar define a triangle. The lower grate assembly is positioned to break up clumps of feed in the lower portion of the hopper and the slopping grate assembly does the same in the central and upper portion.

Figure 10:
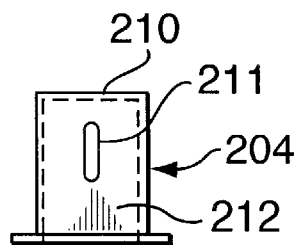
FIG. 10 is a top plan view of FIG. 9.
Figure 12:
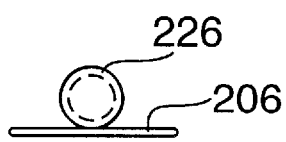
FIG. 12 is a top plan view of FIG. 11.
Figure 9:
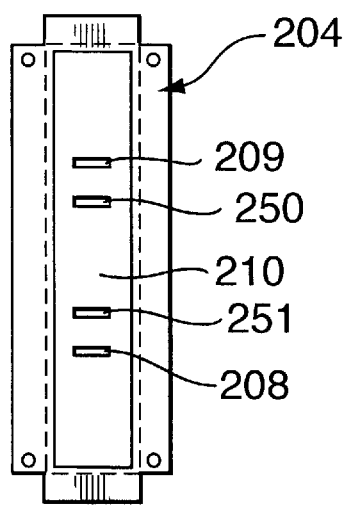
FIG. 9 is a front elevation view of a mounting box for the agitator and agitator operating mechanism of FIG. 6.
Figure 11:
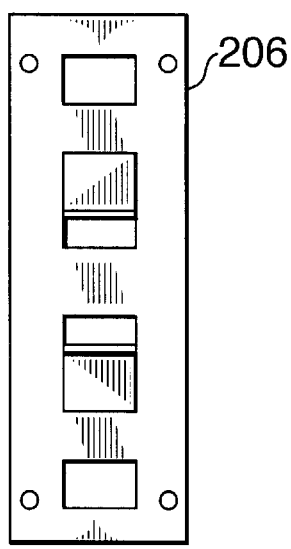
FIG. 11 is a front elevation of a cover plate for the box shown in FIG. 9.
Figure 14:
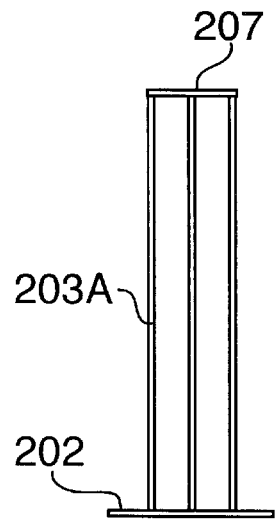
FIG. 14 is a right hand elevation view of FIG. 13.
Figure 15:
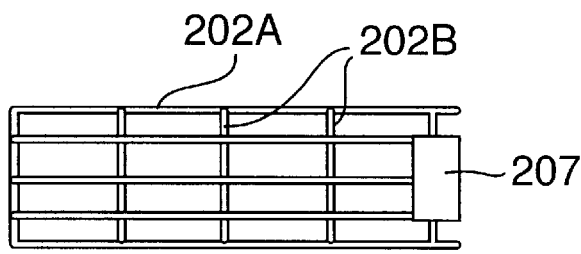
FIG. 15 is a top plan view of FIG. 13.

The bar 201 is slidably mounted in a housing 204 attached as by bolts or studs 205 and a cover plate 206 to the hopper end wall 104 as is clearly shown in FIG. 6. The housing 204 is shown in detail in FIGS. 9 and 10, the cover plate in FIGS. 11 and 12 and the grate assemblies of the agitator 20 in FIGS. 13 to 15 inclusive.

The grate assembly 202 is a rigid structure of elongate spaced apart rods 202A connected to a plurality of spaced apart cross rods 202B. The grate assembly 203 comprises a plurality of elongate spaced apart rods 203A connected at one end to the grate assembly 202 and at the other end to a plate 207 that is rigidly secured to an upper end of the bar 201. The feed agitator 20 can be raised and lowered manually using the operating mechanism 30 shown in detail in FIGS. 6 to 8 inclusive or alternatively the gear drive mechanism shown in FIG. 16 and 17.

Referring principally to FIG. 6 the mechanism 30 comprises a plurality of levers and compression springs that operate in a manner well known with bar clamps except that in the present system the bar is moved and it is moved back and forth.

Referring principally to FIGS. 6 to 8 the agitator operating mechanism comprises a lower L-shaped lever 301 and an upper L5 shaped lever 302 each of which has a slot 304 and a lug 305. The two levers are identical but one is installed in an inverted position relative to the other. The lugs 305 of levers 301 and 302 project into respective slots 208 and 209 in the rear wall 210 of the agitator mounting housing 204(see FIG. 9). The bar 201 passes trough the slot 304 in the respective levers and a slot 211 in each of the respective top and bottom walls 212 and 213 of the housing 204. A pair of slotted washers 315 and 316 and a compression spring 317 are slidably mounted on the bar at a position between the levers 301,302 and the housing respective end walls 213 and 212.

A pair of bar lock levers 320, each with an end tab 321 and a slot 322, are spring biased to a locking position by respective compression springs 323 and 324. The compression springs project into and bear against respective cap members 226 and 227 fixedly secured to the cover plate 206. The tabs 321 on the levers 320 project into respective slots 250 and 251 in the back wall 210 of the housing 204.

The levers 301,302, and the pair of levers 320 pass through holes in the cover plate 206 and are finger or hand engageable enabling releasing the lock grip of one of the levers and then moving the bar 201 using one of the levers 301 or 302 to move the agitator down or up as the case may be.

The levers 301 and 302 have respective extensions 330 and 340 attached thereto by respective hinges 331 and 341. The pivot axes of the hinges are off-set from one another, and the levers and lever extensions differ in length, permitting one lever extension to overlap the other when folded to an inoperative position shown in dotted line in FIG. 6. The lever extensions 330 and 340 have respective portions 332 and 342 projecting beyond the hinge associated therewith and these abut the lever associated therewith. Pivoting lever extension 340 in a counter-clockwise direction causes the extension to engage lever 302 effectively increasing its length thus providing greater leverage to move the agitator up. Similarity pivoting lever extension 330 in a clockwise direction effectively provides a longer lever arm for lever 301 to move the bar 201 down.

A second agitating means in the hopper comprises one or more posts 150 (two being shown in FIG. 1) secured to and projecting upwardly from the slide plate 106. These posts stir or agitate the feed below the lower grate assembly 202 each time the plate 106 is moved to open or close the dispensing opening.

Figure 16:
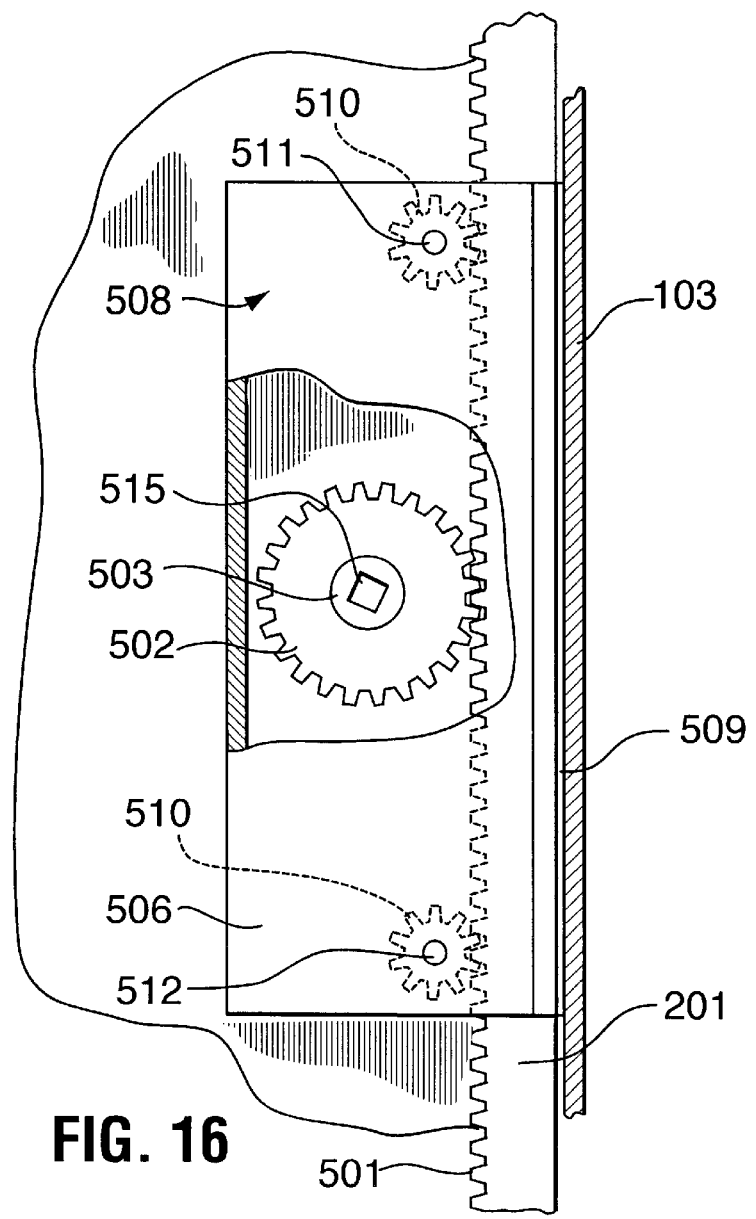
FIG. 16 is a part elevation, part broken, view of a modified agitator operating mechanism.
Figure 17:
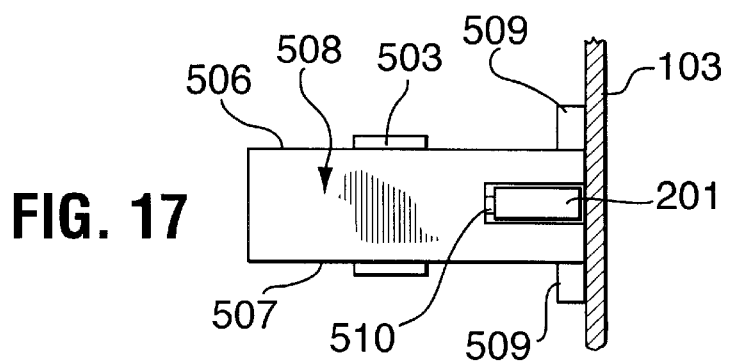
FIG. 17 is a plan view of FIG. 16.

In the embodiment illustrated in FIGS. 16 and 17 the agitator bar 201 has a series of gear teeth providing a rack 501 that meshes with a drive gear 502 mounted by a shaft 503 in respective opposite side walls 506 and 507 of a housing 508. The housing has a mounting flange 509 and bolts and nuts (not shown) can be used to attach the housing to the hopper end wall 103. The top and bottom walls of the housing 508 are notched as indicated at 516 for the bar 201. If desired the bar can be stabilized by an upper and lower pair of idler gears(or rollers) 510 supported by shafts 511 and 512.

The gear shaft 503 has a square or out of round socket 515 for receiving a correspondingly shaped end of a crank or socket wrench drive. Rotating gear 502 obviously will move the agitator up or down as desired at the time of use. A hole can be provided in the front wall 101 of the hopper and aligned with the socket 515 for inserting a drive rod into the socket. Alternatively the shaft 503 can extend to or through a hole in the hopper wall 101 wall.

In this embodiment the bar 201 is held captive against the hopper side wall by the housing 508 when the latter is secured to the hopper wall. If desired a slide wear plate can be held captive between the housing 508 and the hopper wall. Assembly is simple as the bar simply slip fits into the slots 516. Should one desire to have the agitator remain in various sheet positions a worm gear drive can readily be adapted to move the bar 201.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A transportable animal feed storage bin, comprising:
a refillable hopper having a dispensing opening in a lower portion thereof, means to selectively open and close said opening, agitator means movably mounted in said hopper to loosen clumps of feed therein, said agitator means including a rigid elongate member, an open grate assembly secured to and projecting from said elongate member, mounting and guide means mounting said rigid member in said hopper for reciprocal movement and operating means on said mounting means to reciprocally move said agitator, said operating means comprising a plurality of levers, springs and aperatured washers to releaseably lock said bar and levers to move said bar.

2. The transportable animal feed storage bin as defined in claim 1, wherein said grate means comprises an upper grate assembly and a lower grate assembly.

3. The transportable animal feed storage bin as defined in claim 2, wherein said grate assemblies are interconnected at one end thereof and wherein their opposite respective ends are connected to said elongate member at positions spaced apart longitudinally there along.

4. The transportable animal feed storage bin as defined in claim 3, wherein the grate assemblies and rod, in side elevation, is triangular in outline.

5. The transportable animal feed storage bin as defined in claim 1, wherein said hopper lower portion tapers inwardly toward said dispensing opening.

6. The transportable animal feed storage bin as defined in claim 5, wherein said dispensing opening is located in a bottom end of said hopper.

7. A transportable animal feed storage bin comprising:
a refillable hopper having a dispensing opening in a lower portion thereof, means to selectively open and close said opening, agitator means movably mounted in said hopper to loosen clumps of feed therein, said agitator means including a rigid elongate member, an open grate assembly secured to and projecting from said elongate member, mounting and guide means mounting said rigid member in said hopper for reciprocal movement and operating means on said mounting means to reciprocally move said agitator, said operating means comprising a rack on said bar and drive gear meshing therewith and mounted on said bar mounting and guide means.

8. The transportable animal feed storage bin as defined in claim 1, including mounting means on a wall of said hopper for suspending said hopper from a vertical structure.

9. The transportable animal feed storage bin as defined in claim 7, wherein said grate means comprises an upper grate assembly and a lower grate assembly.

10. The transportable animal feed storage bin as defined in claim 9, wherein said upper grate assembly and said lower grate assembly are interconnected at one end thereof and wherein their opposite respective ends are connected to said elongate member at positions spaced apart longitudinally there along.

11. The transportable animal feed storage bin as defined in claim 10, wherein said upper grate assembly and said lower grate assembly are triangular in outline.

12. The transportable animal feed storage bin as defined in claim 7, wherein said hopper lower portion tapers inwardly toward said dispensing opening.

13. The transportable animal feed storage bin as defined in claim 12, wherein said dispensing opening is located in a bottom end of said hopper.

14. The transportable animal feed storage bin as defined in claim 7, including mounting means on a wall of said hopper for suspending said hopper from a vertical structure.

* * * * *